US010750388B2

(12) United States Patent
Guha et al.

(10) Patent No.: US 10,750,388 B2
(45) Date of Patent: Aug. 18, 2020

(54) SYSTEM AND METHOD FOR QUALIFYING SERVICE IN MULTI-SPECTRUM ACCESS NETWORK

(71) Applicant: Verizon Patent and Licensing Inc., Arlington, VA (US)

(72) Inventors: Ratul K. Guha, Warwick, PA (US); Danielle Elizabeth Adamo, Cedar Knolls, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 70 days.

(21) Appl. No.: 16/225,308

(22) Filed: Dec. 19, 2018

(65) Prior Publication Data
US 2020/0205019 A1   Jun. 25, 2020

(51) Int. Cl.
*H04L 12/26* (2006.01)
*H04W 24/08* (2009.01)
*H04L 29/08* (2006.01)

(52) U.S. Cl.
CPC .......... *H04W 24/08* (2013.01); *H04L 67/303* (2013.01)

(58) Field of Classification Search
CPC ........... H04B 3/46; H04B 17/00; H04L 43/00; H04L 43/50; H04L 67/303; H04W 24/00; H04W 24/08
USPC ....................................................... 370/252
See application file for complete search history.

(56) References Cited

U.S. PATENT DOCUMENTS

| 10,362,502 | B2* | 7/2019 | Van Doorselaer | H04W 24/08 |
| 2012/0020248 | A1* | 1/2012 | Granlund | H04W 52/267 |
| | | | | 370/254 |
| 2012/0108199 | A1* | 5/2012 | Wang | H04W 4/90 |
| | | | | 455/405 |
| 2013/0267179 | A1* | 10/2013 | Parekh | H04L 41/22 |
| | | | | 455/67.11 |
| 2013/0279354 | A1* | 10/2013 | Ekman | H04L 41/5009 |
| | | | | 370/252 |
| 2014/0098846 | A1* | 4/2014 | Emmanuel | H04B 5/0043 |
| | | | | 375/224 |
| 2014/0160955 | A1* | 6/2014 | Lum | H04W 24/06 |
| | | | | 370/252 |
| 2014/0357298 | A1* | 12/2014 | Koskinen | H04W 64/00 |
| | | | | 455/456.1 |
| 2015/0341945 | A1* | 11/2015 | Panchal | H04L 5/001 |
| | | | | 370/329 |
| 2015/0382212 | A1* | 12/2015 | Elliott | H04W 24/02 |
| | | | | 370/252 |
| 2016/0044705 | A1* | 2/2016 | Gao | H04W 28/24 |
| | | | | 370/330 |
| 2017/0171904 | A1* | 6/2017 | Wu | H04W 48/02 |
| 2017/0339584 | A1* | 11/2017 | Ketonen | H04W 24/04 |
| 2017/0339630 | A1* | 11/2017 | Ketonen | H04W 24/08 |
| 2018/0270680 | A1* | 9/2018 | Van Doorselaer | H04W 24/08 |

(Continued)

Primary Examiner — Robert J Lopata

(57) ABSTRACT

A method, a device, and a non-transitory storage medium are described in which a fixed wireless qualification service is provided. A network device uses test service information pertaining to a radio band and a candidate location from an end device as a basis to qualify prospective fixed wireless service, which is provisioned via a different radio band, at the candidate location. The network device further may calculate expected downlink and uplink values for the prospective fixed wireless service based on differences between the radio bands in terms of bandwidth, utilization factors, path losses, and device loses.

20 Claims, 14 Drawing Sheets

(56) References Cited

U.S. PATENT DOCUMENTS

| | | | |
|---|---|---|---|
| 2018/0338250 A1* | 11/2018 | Mishra | H04W 24/10 |
| 2019/0191352 A1* | 6/2019 | Chong | H04W 36/08 |
| 2020/0015113 A1* | 1/2020 | Xin | H04L 41/5003 |
| 2020/0037233 A1* | 1/2020 | Taneja | H04W 24/02 |
| 2020/0059428 A1* | 2/2020 | Nadeau | H04L 41/5009 |
| 2020/0120582 A1* | 4/2020 | Yang | H04W 48/12 |

* cited by examiner

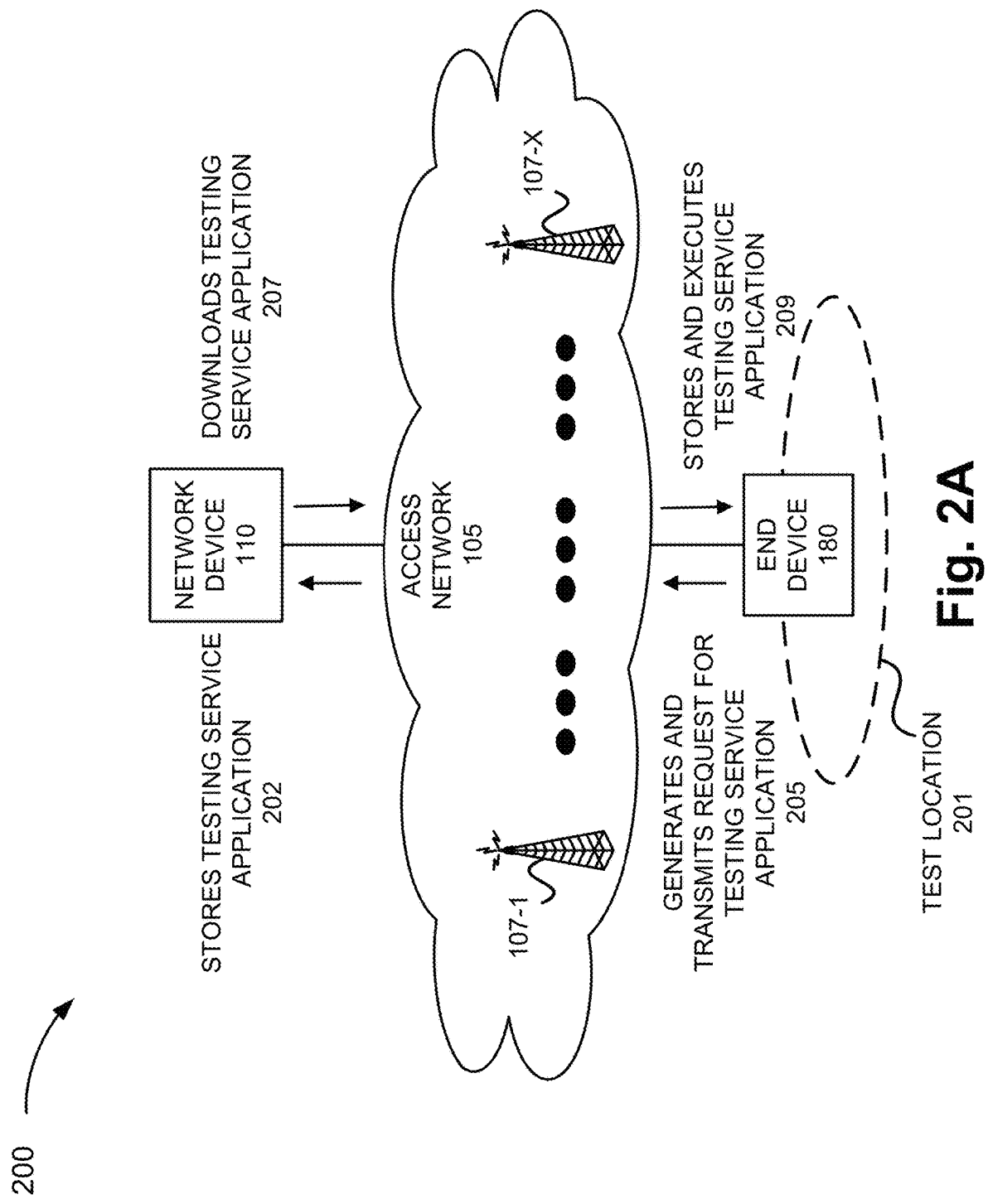

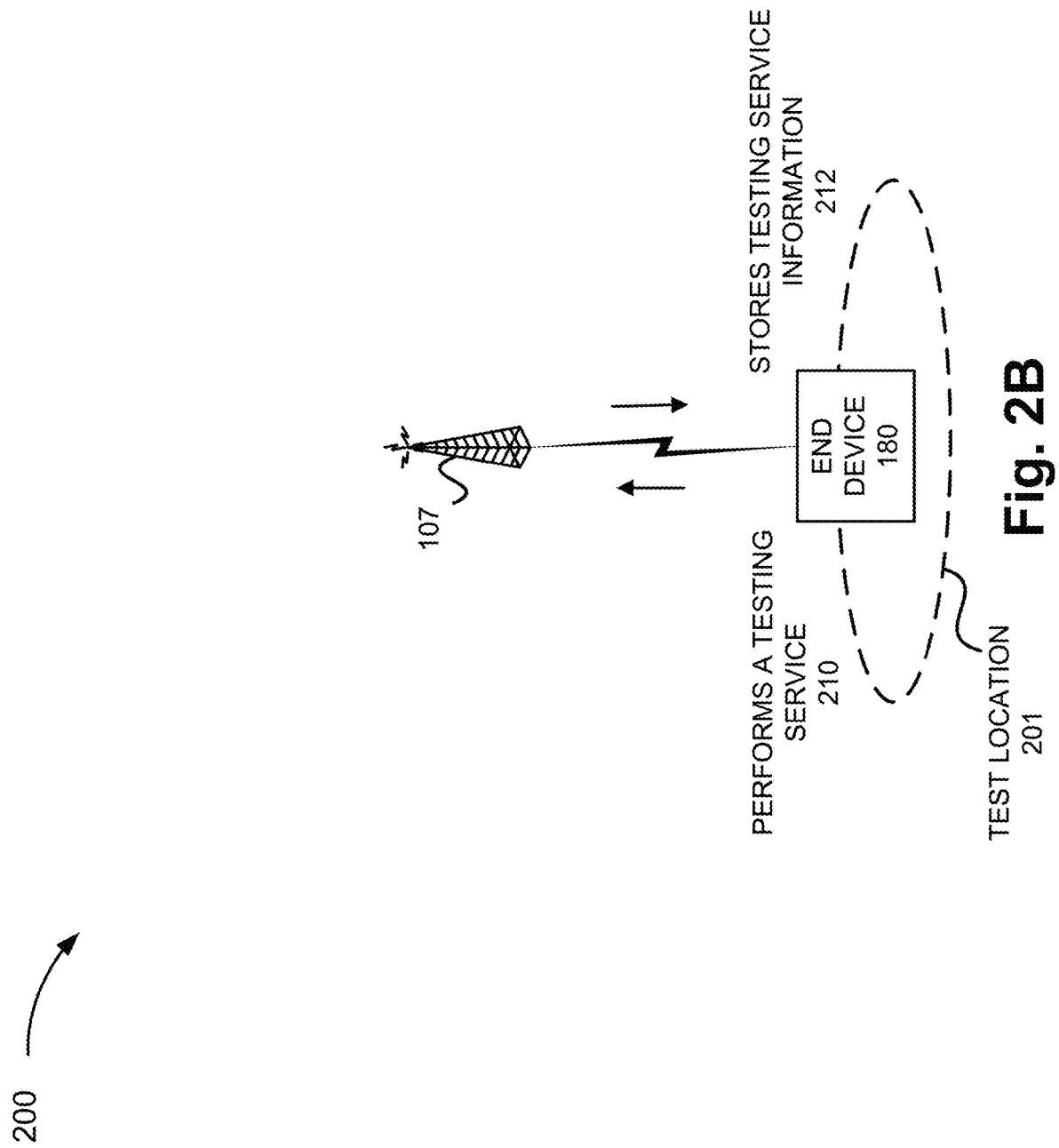

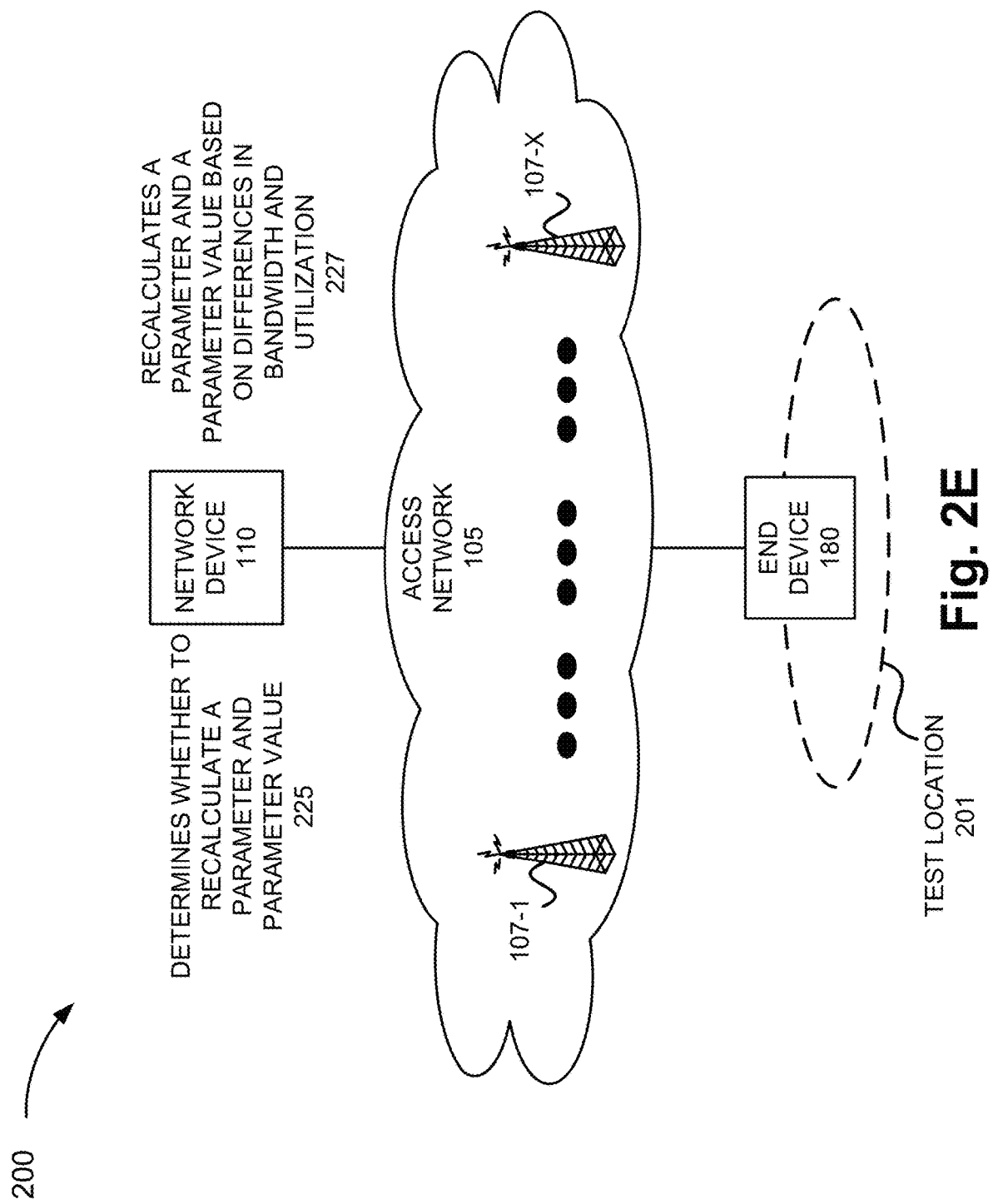

SYSTEM AND METHOD FOR QUALIFYING SERVICE IN MULTI-SPECTRUM ACCESS NETWORK

BACKGROUND

With the development and design of future wireless networks (e.g., Fifth Generation (5G) networks, etc.) by various organizations and service providers, wireless access networks may provide wireless access to end devices using multiple radio access technologies (RATs) and radio spectrums.

BRIEF DESCRIPTION OF THE DRAWINGS

FIGS. 2A-2F are diagrams illustrating exemplary processes of exemplary embodiments of the fixed wireless qualification service;

DETAILED DESCRIPTION OF PREFERRED EMBODIMENTS

Figure 1A:
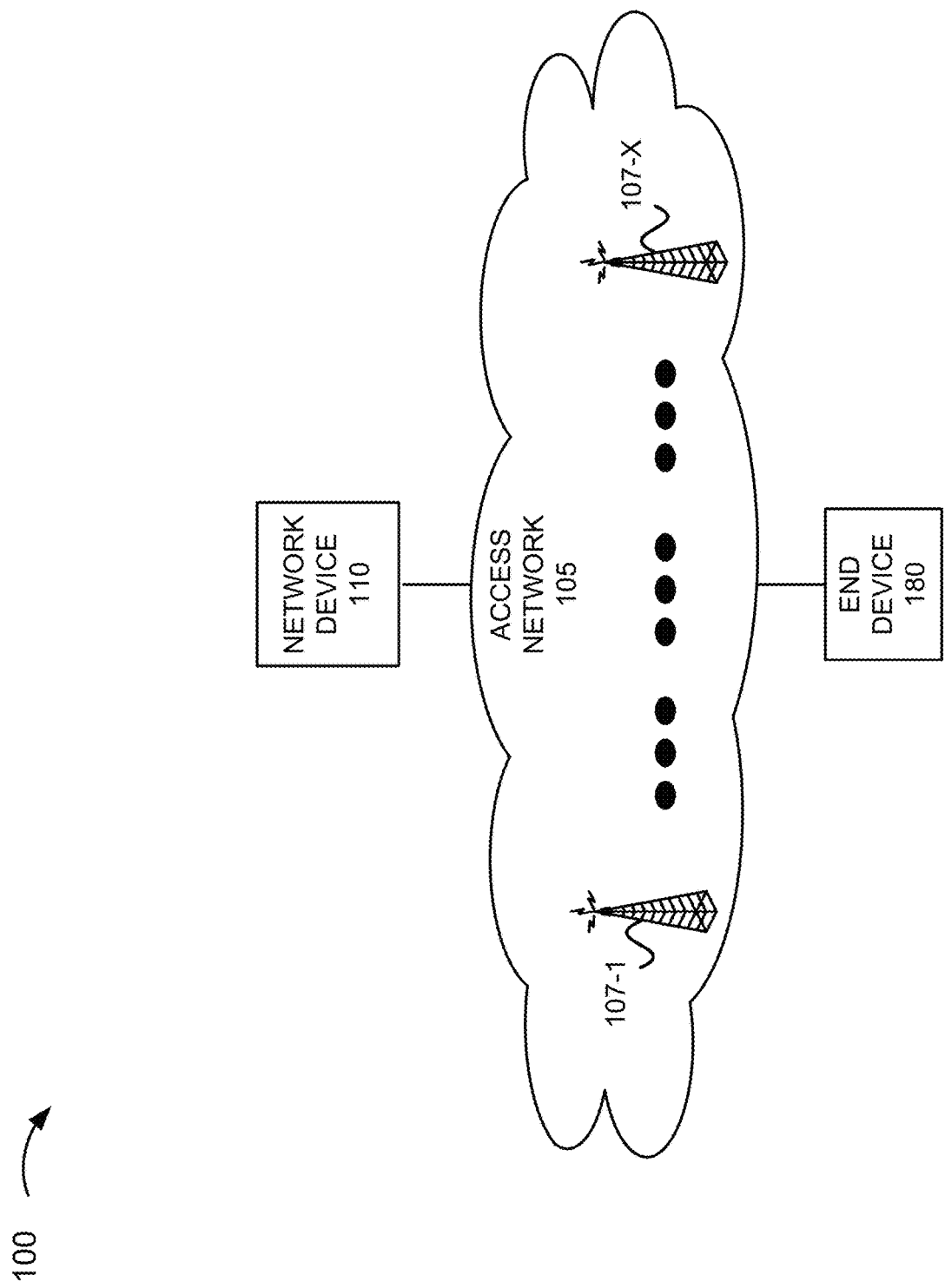
FIG. 1A is a diagram illustrating an exemplary environment in which an exemplary embodiment of a fixed wireless qualification service may be implemented.

The following detailed description refers to the accompanying drawings. The same reference numbers in different drawings may identify the same or similar elements. Also, the following detailed description does not limit the invention.

A network should support various use cases, meet various performance metrics, allow for scalability and flexibility, and so forth. For example, the network may include a radio access network (RAN) and a core network that provides access to a service or application layer network, a cloud network, a multi-access edge computing (MEC) network, a fog network, and so forth. The radio access network may include diverse RATs (e.g., Fourth Generation (4G) wireless, 4.5G wireless, Fifth Generation (5G) wireless, backhaul/fronthaul network, Long Term Evolution (LTE), LTE-Advanced (LTE-A), LTE-A Pro, future generation, etc.) that may use different segments of radio spectrum (e.g., centimeter (cm) wave, millimeter (mm) wave, mid-band below 6 Gigahertz (GHz), low-band below 2 GHz, above 6 GHz, licensed radio spectrum, unlicensed radio spectrum, particular frequency band, particular carrier frequency, etc.). Additionally, the network may include different and multiple functional splitting, such as options 1, 2, 3, 4, 5, 6, 7, or 8 that relate to combinations of RAN and core network including EPC and NGC, or the splitting of the physical layer, Media Access Control (MAC), Radio Link Control (RLC), and Packet Data Convergence Control (PDCP), plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), carrier aggregation (CA), network slicing, coordinated multipoint (CoMP), and/or another type of connectivity service.

In a fixed wireless context, there are significant challenges in determining whether a location can provide fixed wireless service that supports a requested level of service in a diversified wireless network environment. For example, each RAT and associated radio spectrum provides a particular service level based on various characteristics associated with the RAT, the radio spectrum (e.g., cm wave versus mm wave, etc.), and the frequency band (e.g., an Evolved Universal Mobile Telecommunications System (UMTS) Terrestrial Radio Access (E-UTRA) band 2 or 3; below 6 GHz band (e.g., 3.1-3.5 GHz band, etc.), above 6 GHz band (e.g., 50 GHz band, 37-40 GHz, etc.). For example, these characteristics may include propagation characteristics and performance metrics (e.g., bandwidth, various types of bit rates (e.g., guaranteed, maximum, minimum, etc.), error rates, latency, load on the sector, etc.). Additionally, the level of service may relate to different end user applications or services, such as a broadband service, a cloud support service, a video distribution service, and so forth, in which depending on the end user application or service a minimum value for a characteristic (e.g., bitrate, etc.) may be needed.

A service provider or other entity may calculate parameter values relating to propagation characteristics, performance metrics, etc., in an offline or static manner based on modeling, theoretical behavior of radio, etc., but such offline or static calculations may not accurately reflect the service level available at a candidate location for fixed wireless service because there are numerous variables that may not be taken into account by such an approach. For example, the offline approach may not obtain specific information relating to the materials used in a building, type of windows and permittivity, the terrain (e.g., trees, bushes, etc.) of the location relative to a base station, and other factors that impact the accuracy of offline propagation calculations. Also, while the service provider or other entity may qualify a level of fixed wireless service in an on-line manner, such as visiting the location and performing measurements at the location to identify the service level at the location where fixed wireless access is to be provided, these approaches require the use of significant resources—both human and network. For example, a technician or other individual may visit the location (e.g., truck rolls, site visits, etc.) and perform various types of measurements and analysis of the measurements in relation to an available wireless connection with the wireless network. Nevertheless, such analysis may lead to inaccurate results because the analysis may not account for various types of conditions pertaining to the wireless network (e.g., congestion level at the cell and location), differences between a loss associated with a device used for obtaining measurements relative to a loss associated with a fixed wireless service device to which the measurements pertain, differences between a radio spectrum band used by the device for obtaining measurements relative to an intended radio spectrum band via which the fixed wireless service is to be provided, and/or other types of factors pertaining to the context of the test measurement and the intended fixed wireless service.

According to exemplary embodiments, a fixed wireless qualification service is provided. According to an exemplary embodiment, an end device installs an application that provides a testing service. For example, the testing service may perform measurement of an uplink speed, a downlink speed, and/or a signal quality measurement. The testing service may further collect or obtain various types of end device and network information. For example, the end device and network information may include end device profile information, wireless frequency band used when performing the measurements, cell identifier associated with a wireless station used when performing the measurements, and/or other types of information, as described herein. According to an exemplary embodiment, the testing service provides a network device with the testing service information (e.g., measurement information, end device information, network information).

According to an exemplary embodiment, the network device calculates a service qualification value based on the testing service information, as described herein. According to an exemplary embodiment, the network device determines a fixed wireless service based on the service qualification value. According to an exemplary embodiment, the network device may calculate one or multiple parameters and parameter values not included in the testing service information, as described herein. For example, the network device may calculate an amount of congestion pertaining to the time when the testing service was used and the test location. According to an exemplary embodiment, the network device may re-calculate one or multiple parameters and parameter values pertaining to the testing service information, as described herein. For example, the network device may re-calculate the downlink speed and/or the uplink speed based on the amount of congestion. Additionally, or alternatively, for example, the network device may re-calculate the downlink speed and/or the uplink speed based on differences between the frequency band used during the testing service relative to the target frequency band to which the fixed wireless service pertains. According to an exemplary embodiment, the network device may calculate other types of parameters and parameter values, as described herein, that relate to the calculation of the service qualification value.

As a result of the foregoing, the fixed wireless qualification service may improve the accuracy for qualifying a fixed wireless service at a location exposed to a diversified multi-spectrum wireless network. For example, the fixed wireless qualification service may account for differences between the device used during a test and the fixed wireless service device. These differences may include, for example, differences between the frequency band tested and the target frequency band to be used for the fixed wireless service. Additionally, the differences may include other differences related to losses (e.g., path loss, losses associated with the testing device and the fixed wireless service device, etc.) and level of congestion in the access network during the testing, as described herein.

FIG. 1A is a diagram illustrating an exemplary environment 100 in which an exemplary embodiment of the fixed wireless qualification service may be implemented. As illustrated, environment 100 includes an access network 105. Access network 105 includes access devices 107-1 through 107-X (also referred to as access devices 107, and individually and generally as access device 107). According to an exemplary embodiment, environment 100 includes an end device 180 and a network device 110.

The number, the type, and the arrangement of network devices in environment 100, as illustrated and described, are exemplary. A network device, a network element, or a network function (referred to herein simply as a network device) may be implemented according to one or multiple network architectures (e.g., a client device, a server device, a peer device, a proxy device, a cloud device, a virtualized function, and/or another type of network architecture (e.g., Software Defined Networking (SDN), virtual, logical, network slicing, etc.). Additionally, a network device may be implemented according to various computing architectures, such as centralized, distributed, cloud (e.g., elastic, public, private, etc.), edge, fog, and/or another type of computing architecture. The number, the type, and the arrangement of networks in environment 100, as illustrated and described, are exemplary.

Environment 100 includes communication links between the network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1A. A direct communicative connection may not involve an intermediary device and/or an intermediary network. The number and the arrangement of communication links illustrated in environment 100 are exemplary.

Access network 105 may include multiple networks of multiple types and technologies. For example, access network 105 may include a 4G RAN, a 4.5G RAN, a 5G RAN, a future generation RAN, and/or a legacy RAN, as described herein. By way of further example, access network 105 may include an Evolved Universal Mobile Telecommunications System (UMTS) Terrestrial Radio Access Network (E-UTRAN) of an LTE network, an LTE-A network, and/or an LTE-A Pro network, a future or next generation RAN (e.g., a 5G-access network (5G-NR)), a Third Generation (3G) RAN, a 3.5G RAN, a U-TRAN, a Universal Mobile Telecommunications System (UMTS) RAN, a Global System for Mobile Communications (GSM) RAN, a GSM EDGE RAN (GERAN), a Code Division Multiple Access (CDMA) RAN, a Wideband CDMA (WCDMA) RAN, an Ultra Mobile Broadband (UMB) RAN, a High-Speed Packet Access (HSPA) RAN, and/or an Evolution Data Optimized (EV-DO) RAN.

Figure 1B:
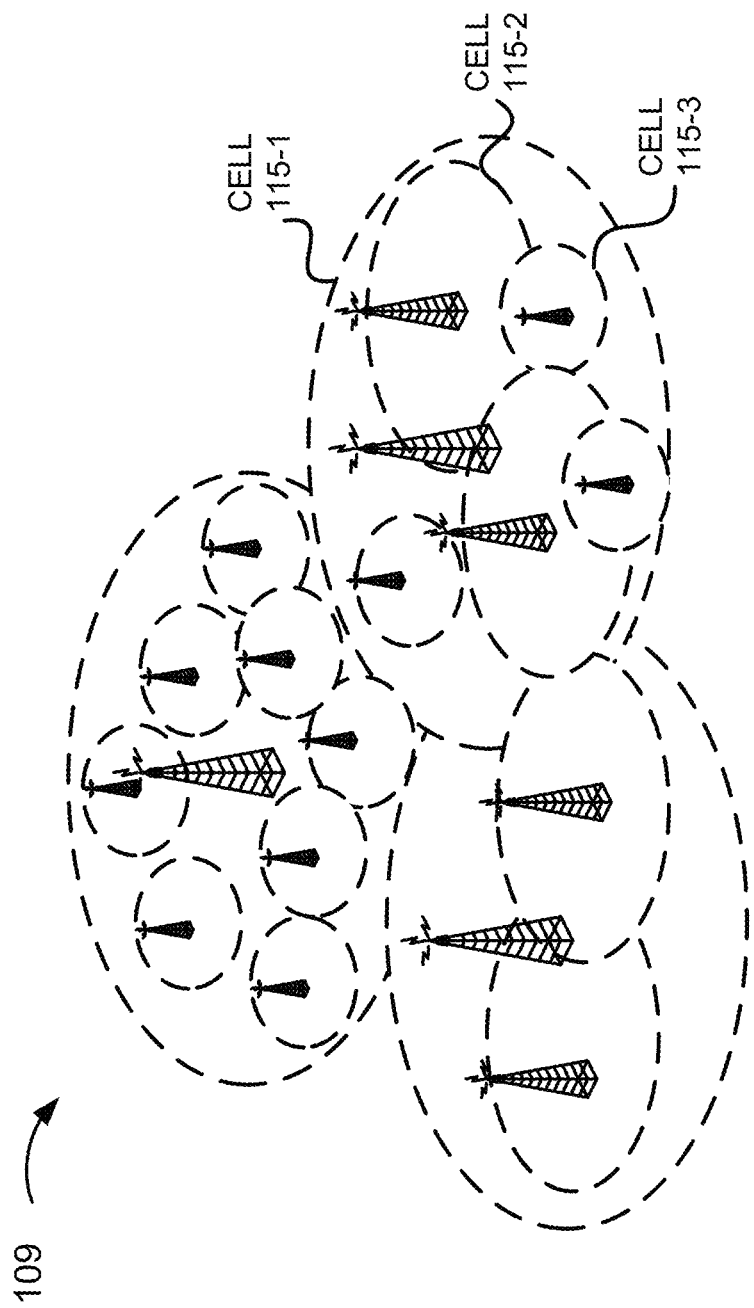
FIG. 1B is a diagram illustrating exemplary cell configurations that are consistent with the exemplary environment of FIG. 1A.

Depending on the implementation, access network 105 may include multiple types of access devices 107. For example, access devices 107 may include an evolved Node B (eNB), a next generation Node B (gNB), an evolved Long Term Evolution (eLTE) eNB, a radio network controller (RNC), a remote radio head (RRH), a baseband unit (BBU), a small cell node (e.g., a picocell device, a femtocell device, a microcell device, a home eNB, a repeater, etc.)), or another type of wireless node. According to various exemplary embodiments, access network 105 may be implemented to include various architectures of wireless service, such as, for example, macrocell, microcell, femtocell, picocell, metrocell, new radio (NR) cell, LTE cell, non-cell, or another type of cell architecture. Additionally, according to various exemplary embodiments, access network 105 may be implemented according to various wireless standards, wireless frequencies/bands, different and multiple functional splitting, and/or other types of network services, as previously described. For example, referring to FIG. 1B, access network 105 may include various types of cells, such as cell 115-1, cell 115-2, and cell 115-3 (also referred to collectively as cells 115, and individually or generally as cell 115). For example, cell 115-1 may be different from cells 115-2 and 115-3 in terms of size, shape, radio spectrum used, frequency band used, bitrate, and other types of propagation and quality of service (QoS) characteristics and values, and so forth.

Referring back to FIG. 1A, network device 110 includes a device that has computational and communication capabilities. According to an exemplary embodiment, network device 110 includes logic that provides a fixed wireless qualification service, as described herein. According to various exemplary implementations, network device 110 may implemented as a stand-alone network device, a network device of an Operation, Administration, and Management (OAM) system, or another type of network device associated with a service provider or other entity. Although not illustrated, network device 110 may be located in access network 105 or another type of network (e.g., a core network, a MEC network, an external network (e.g., the Internet, an application layer network, a packet data network, etc.)).

End device 180 includes a device that has computational and wireless communication capabilities. According to an exemplary embodiment, end device 180 includes logic that provides a fixed wireless qualification service, as described herein. According to various exemplary embodiments, end device 180 may be implemented as a mobile or a portable end user device. For example, end device 180 may be implemented as smartphone, a personal digital assistant, a tablet, a netbook, a phablet, or a computer (e.g., a palmtop, a laptop, etc.).

End device 180 may support multiple RATs (e.g., 4G, 5G, etc.) and various portions of the radio spectrum (e.g., multiple frequency bands, multiple carrier frequencies, etc.). Additionally, end device 180 may include one or multiple communication interfaces that provide one or multiple (e.g., simultaneous) connections via the same or different RATs, frequency bands, and so forth. The multimode capabilities of end device 180 may vary among end devices 180. According to some exemplary embodiments, end device 180 may operate or support a RAT and a frequency band that is the same as a fixed wireless service device to which the fixed wireless qualification service pertains. According to other exemplary embodiments, end device 180 may not operate or support a RAT and a frequency band that is the same as the fixed wireless service device to which the fixed wireless qualification service pertains. For example, end device 180 may operate or support the wireless access network of an LTE network, and the fixed wireless service device to be installed may support the wireless access network of a future generation wireless access network (e.g., 5G, etc.). Additionally, for example, end device 180 may support AWS frequencies while the fixed wireless service device may support mm wave frequencies even where both devices may support 5G NR technologies.

FIGS. 2A-2F are diagrams illustrating an exemplary process of an exemplary embodiment of the fixed wireless qualification service. As illustrated, an environment 200, which is consistent with environment 100, includes a test location 201 at which end device 180 may perform a fixed wireless qualification service. For example, end device 180 may perform the fixed wireless qualification service for a fixed wireless service device to be potentially installed at test location 201. According to an exemplary scenario, a user or a potential user of a service provider for fixed wireless service may query the service provider (e.g., customer support department, a web server, etc.) regarding a level of fixed wireless service at a specified location. The level of fixed wireless service may relate to a certain bitrate, a particular application or service to be supported (e.g., a cloud service, an enterprise or business-related service, a broadband service for home use, etc.) and/or other types of metrics or categories.

Referring to FIG. 2A, according to an exemplary scenario, network device 110 may store a testing service application 202. For example, the testing service application may include logic that provides certain procedures of the fixed wireless qualification service, as described herein. According to other exemplary scenarios, a network device (not illustrated) other than network device 110 may store the testing service application and provide a downloading service, as described herein. For example, the testing service application may be available on a network device that hosts an online application store, a play store, or a server on the Internet. Additionally, according to an exemplary scenario, assume a user (not illustrated) of end device 180 may wish to qualify for fixed wireless service at test location 201. The user may cause end device 180 to generate and transmit a request for the testing service application 205. In response to receiving the request, network device 110 and end device 180 download the testing service application 207. End device 180 stores and executes the testing service application 209.

Referring to FIG. 2B, end device 180 performs a testing service 210 and stores testing service information 212. As a part of the testing procedure, end device 180 may establish a wireless connection with one or multiple access devices 107 that are within range. For example, end device 180 may search and detect access device 107 according to a cell selection procedure or cell reselection procedure. According to various exemplary embodiments, for each access device 107, end device 180 may run one or multiple speed tests (e.g., download speed, upload speed) and make one or multiple radio signal strength and/or quality measurements (e.g., Reference Signal Receive Power (RSRP), a Received Signal Strength Indicator (RSSI), a Reference Signal Received Quality (RSRQ), or an analogous type of measurement, such as signal-to-noise ratio (SNR), signal-to-interference-plus-noise ratio (SINR), or other channel condition value).

End device 180 may also obtain other types of information pertaining to the wireless connection, such as channel number (e.g., an E-UTRA Absolute Radio Frequency Channel Number (EARFCN), etc.) and an identifier of access device 107 (e.g., a cell identifier, an E-UTRAN cell global identifier (ECGI), a Physical Cell Identifier (PCI), or a globally unique identifier (GUID), such as a Global eNB Identifier (Global eNB ID), etc.). End device 180 may also obtain information pertaining to end device 180, such as end device profile information. The end device profile information may include make and model number of end device 180, information regarding the wireless communication interface of end device 180, and/or other types of characteristics and/or capabilities pertaining to end device 180.

According to some exemplary scenarios, the wireless capabilities of end device 180 may not support the intended radio spectrum associated with the fixed wireless service device to which the test pertains. As described herein, according to such exemplary scenarios, network device 110 may perform calculations that may adjust a parameter and a parameter value included in the testing service information. According to other exemplary scenarios, the wireless capabilities of end device 180 may support the intended radio spectrum associated with the fixed wireless service device to which the test pertains. End device 180 may also obtain other types of context information pertaining to the test, such as geographic coordinates of the test location, date and time information, and/or other types of information relating to the wireless connection with access device 107.

Figure 2C:
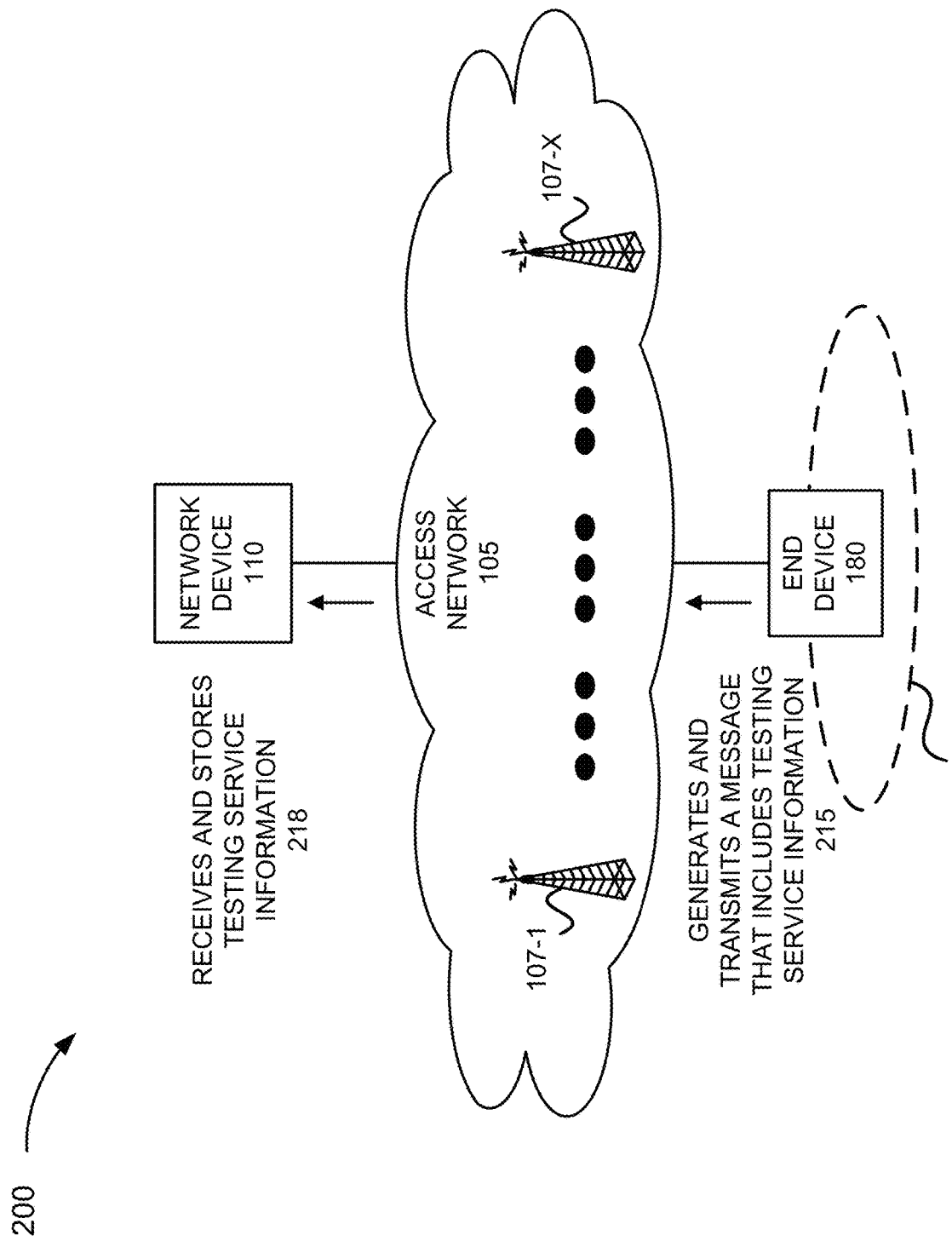
Figure 2D:
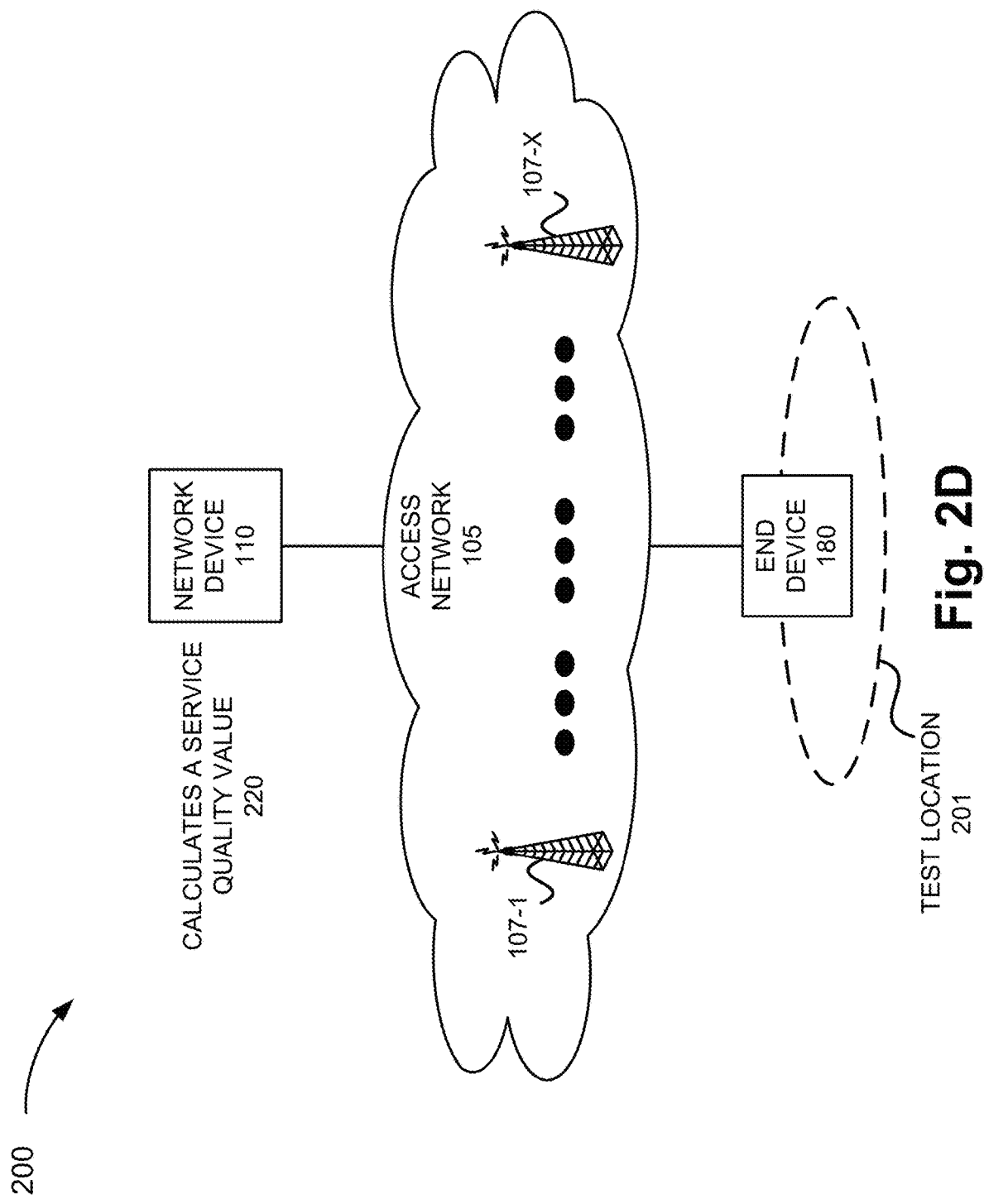

Referring to FIG. 2C, end device 180 generates and transmits a message that includes the testing service information 215. Subsequently, network device 110 receives and stores the testing service information 218. Referring to FIG. 2D, in response to receiving the testing service information, network device 110 calculates a service qualification value 220 that indicates a level of fixed wireless service available at the test location. $S^F_D$ indicates a service qualification value. $S^F_D$ may be calculated for a downlink based on the following expression:

$$S^F_D = (S^E)_D * 10^{\frac{20\log_{10}(F_s) - 20\log_{10}(F_T) - D_T + D_S}{10}}, \quad (1)$$

and $S^F_U$ may be calculated for an uplink based on the following expression:

$$S^F_U = (S^E)_U * 10^{\frac{20\log_{10}(F_s) - 20\log_{10}(F_T) - D_T + D_S}{10}}. \quad (2)$$

According to an exemplary embodiment, the service qualification values for the downlink and the uplink indicate a downlink bitrate value and an uplink bitrate value. In relation to expressions (1) and (2), as illustrated, the service qualification values may be calculated based on $F_S$, which indicates a center frequency of the test radio band used by end device 180. For example, network device 110 may identify the center frequency based on the channel number information. Additionally, $F_T$ indicates a center frequency of a target or intended radio band. $D_S$ indicates a radio frequency (RF) performance of end device 180, such as the antenna loss or body loss in decibels (dB). For example, network device 110 may determine a loss associated with end device 180 based on the end device profile information. The loss may stem from the antenna and/or other radio frequency components of end device 180, the shape and size of end device 180, and so forth. $D_T$ indicates an RF performance of the fixed wireless service device. For example, network device may determine a loss associated with the fixed wireless service device based on device profile information. $(S^D)_D$ and $(S^E)_U$ are described further below.

Referring to FIG. 2E, according to an exemplary embodiment, in response to receiving the testing service information, network device 110 may determine whether one or multiple parameters and parameter values are to be recalculated 225. For example, according to some exemplary scenarios, end device 180 may not make measurements using the intended radio spectrum band or the RAT via which the fixed wireless service is to be provided. For example, end device 180 may operate and obtain measurements via a wireless connection using a band that access device 107 has LTE configured on, while the fixed wireless device will be operating using a different radio spectrum and a different band (e.g., a mm wave band with 5G NR, etc.). Alternatively, end device 180 may operate on an AWS frequency with 5G NR, and the fixed wireless service device may use mm wave and/or mid-band. According to an exemplary embodiment, network device 110 may identify the frequency band or radio spectrum within which the fixed wireless service device may operate based on the test location and/or a cell identifier included in the test service information. For example, network device 110 may access or obtain information indicating a frequency band that is deployed (e.g., by access device 107) proximate to the test location. By way of further example, end device 180 may obtain measurements via an eNB situated proximate to the test location. Additionally, for example, network device 110 may further determine that a gNB is deployed (or is to be deployed in the future) proximate to the test location and provides wireless access using a radio spectrum band different from that of the eNB. An exemplary embodiment of wireless network data is described further below. The wireless network data includes data that indicates the frequency bands deployed at various locations in a diversified wireless access network 105. Network device 110 may store the wireless network data or access this data from another network device.

Figure 3A:
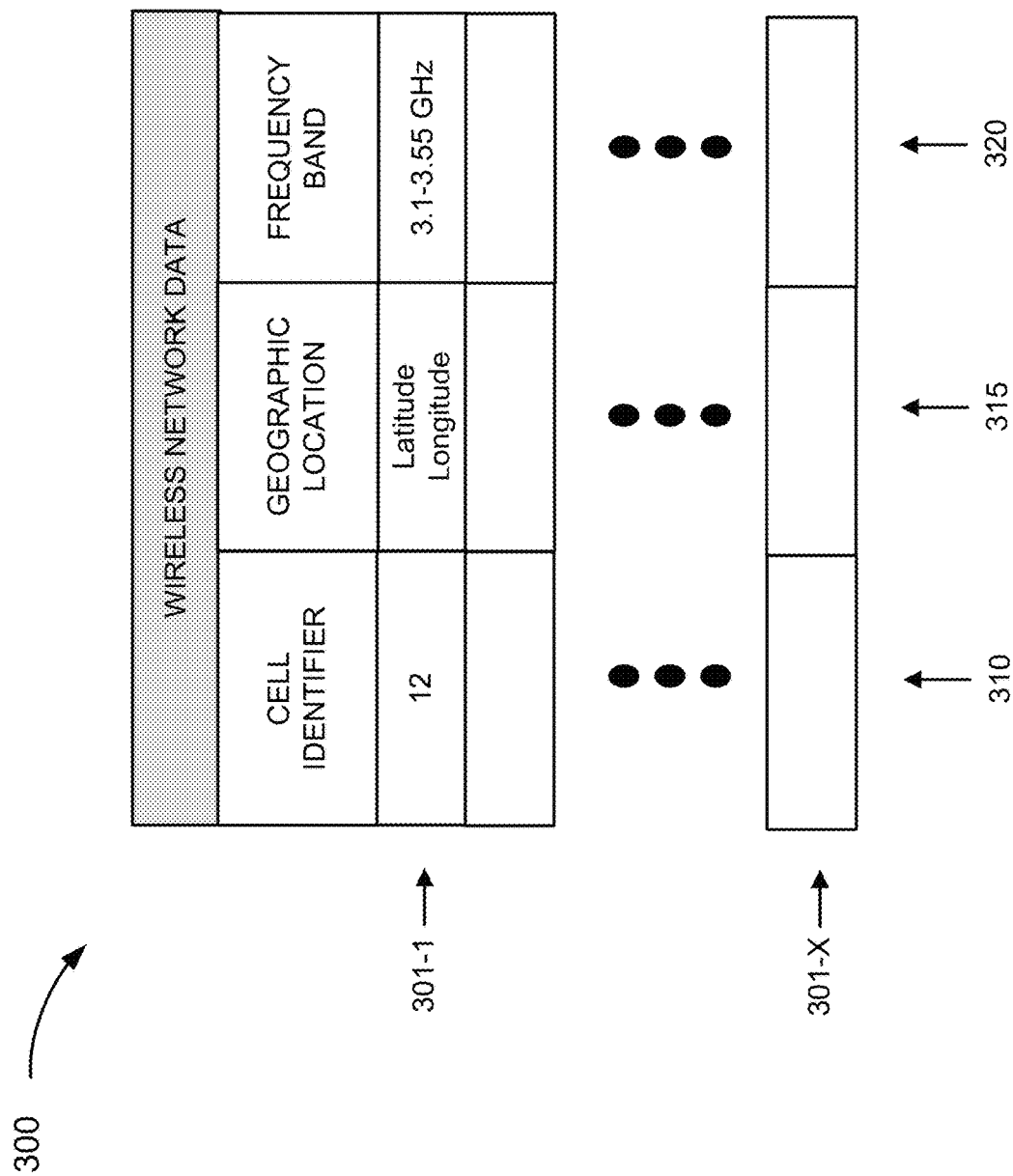
FIG. 3A is a diagram illustrating exemplary wireless network data of the fixed wireless qualification service.

FIG. 3A is a diagram illustrating exemplary wireless network data that may be stored in a table 300. As illustrated, table 300 may include a cell identifier field 310, a geographic location field 315, and a frequency band field 320. As further illustrated, table 300 includes entries 301-1 through 301-X (also referred as entries 301, or individually or generally as entry 301) that each includes a grouping of fields 310, 315, and 320 that are correlated (e.g., a record, etc.). Wireless network data is illustrated in tabular form merely for the sake of description. In this regard, wireless network data may be implemented in a data structure different from a table. The values illustrated in entry 301-1 are exemplary.

Cell identifier field 310 may store data indicating an identifier of a cell. The identifier may be locally or globally unique or not. Geographic location field 315 may store data indicating a geographic location. For example, geographic location field 315 may store latitude and longitude coordinates of the cell (e.g., a point in the cell area; a point associated with an antenna of access device 107). Frequency band field 320 may store data indicating a frequency band of radio spectrum via which wireless access is provided by access device 107.

According to other exemplary implementations, table 300 may store additional, fewer, and/or different instances of wireless network data in support of the fixed wireless qualification service, as described herein. For example, table 300 may store a channel number field that indicates a channel number (e.g., EARFCN, etc.).

Referring back to FIG. 2E, according to an exemplary embodiment, when network device 110 determines that end device 180 did not make measurements using the intended radio spectrum band, network device 110 may determine the bandwidth of the tested radio spectrum band and the bandwidth of the intended radio spectrum band. For example, based on the channel information included in the testing service information, network device 110 may determine the bandwidth associated with the tested radio spectrum band. For example, an EARFCN may correlate to radio spectrum band and bandwidth. Additionally, network device 110 may determine the bandwidth of intended radio spectrum band based on fixed wireless service device profile information.

According to an exemplary embodiment, when network device 110 determines that end device 180 did not make measurements using the intended radio spectrum band, network device 110 may calculate a utilization value pertaining to access device 107 involved during the performance of the testing service. For example, the utilization value may pertain to the time when an uplink speed test was performed and/or a time when a downlink speed test was performed. According to an exemplary implementation, network device 110 may obtain utilization information from access device 107. According to other exemplary implementations, network device 110 may obtain the utilization information from another device (e.g., network monitoring system, etc.). According to even other exemplary implementations, network device 110 may not need to calculate the utilization value because the utilization value may be a fixed number (e.g., engineered to a target value). According to an exemplary implementation, the utilization value may be measured based on a used value relative to a capacity value (e.g., a ratio). For example, the utilization value may pertain to the total amount of data transmitted by access device 107 during a speed test relative to a transmission data capacity value of access device 107. The total amount of data may include data transmitted to other devices attached to access device 107. Similarly, for example, the utilization value may pertain to the total amount of data received by access device 107 during a speed test relative to a reception data capacity value of access device 107. Network device 110 may also calculate a utilization value relative to the intended radio spectrum band in a similar manner. For example, during the a downlink speed test, the utilization value for a tested radio band (e.g., Advanced Wireless Services (AWS) band, etc.) may yield a certain utilization value (e.g., 0.85 or some other value), while for the intended radio band (e.g., a mid-band, a mm wave band, etc.) may correspondingly yield a different utilization value (e.g., 0.3 or some other value) because of the difference in radio capacity, bandwidth, etc., associated with a target access device 107.

According to an exemplary embodiment, network device 110 may re-calculate a downlink speed and an upload speed based on the bandwidth information and the utilization information 227. For example, network device 110 may calculate a value $(S^E)_D$ that indicates an expected downlink service provided on the target radio band. $(S^E)_D$ may be calculated based on the following exemplary expression:

$$(S^E)_D = (S)_D * [(B^D)_T/(B^D)_S] * [(U^D)_S/(U^D)_T]. \quad (3),$$

in which $(S)_D$ indicates a downlink speed test result; $(B^D)_T$ indicates a bandwidth on the target radio band in the downlink; $(B^D)_S$ indicates a bandwidth on the speed test radio band in the downlink; $(U^D)_S$ indicates utilization on the speed test radio band during the time of the speed test in the downlink; and $(U^D)_T$ indicates utilization on the target radio band expected during the fixed wireless service.

Additionally, network device 110 may calculate a value $(S^E)_U$ that indicates an expected uplink service provided on the target radio band. $(S^E)_U$ may be calculated based on the following exemplary expression:

$$(S^E)_U = (S)_U * [(B^U)_T/(B^U)_S] * [(U^U)_S/(U^U)_T] \quad (4),$$

in which $(S)_U$ indicates an uplink speed test result; $(B^U)_T$ indicates a bandwidth on the target radio band in the uplink; $(B^U)_S$ indicates a bandwidth on the speed test radio band in the uplink; $(U^U)_S$ indicates utilization on the speed test radio band during the time of the speed test in the uplink; and $(U^U)_T$ indicates utilization on the target radio band during the time of the test in the uplink. As indicated above in relation to exemplary expressions (1) and (2), the values $(S^E)_D$ and $(S^E)_U$ may be used to calculate the service qualification values for the downlink and the uplink.

Additionally, according to an exemplary embodiment, the service qualification values for the downlink and the uplink account for path losses. For example, network device 110 may calculate a path loss ($PL_S$), which indicates a path loss associated with the test radio band. $PL_S$ may be calculated based on the following expression:

$$PL_S = 20 - \text{Reference Signal Received Power (RSRP)} \quad (5).$$

According to other exemplary implementations, other known expressions or techniques may be used to calculate the path loss, which may use measurements received from end device 180 other than RSRP, or in combination with RSRP.

$PL_T$ indicates an adjustment to the path loss relative to the fixed wireless service device. $PL_T$ may be calculated based on the following expression:

$$PL_T = PL_S + 20 \log_{10}(F_T) - 20 \log_{10}(F_S) \quad (6).$$

$PL^E_T$ indicates an expected path loss of the fixed wireless service device. $PL^E_T$ may be calculated based on the following expression:

$$PL^E_T = PL_T - D_T + D_S \quad (7).$$

As an example, end device 180 may measure an RSRP, which results in calculating a path loss of 115 dB (e.g., $PL_S$). In addition, end device 180 may have performance loss of 5 dB (e.g., $D_S$). According to this example, there is a 120 dB loss. Let's assume that the fixed wireless service device has an RF performance loss of 2 dB (e.g., $D_T$). Thus, the path loss for the fixed wireless service device may be calculated as 118 dB (e.g., 120 dB-2 dB). An exemplary embodiment of end device profile data is described further below. The end device profile data may include data that indicates a performance loss. Network device 110 may store the end device profile data or access this data from another network device.

Figure 3B:
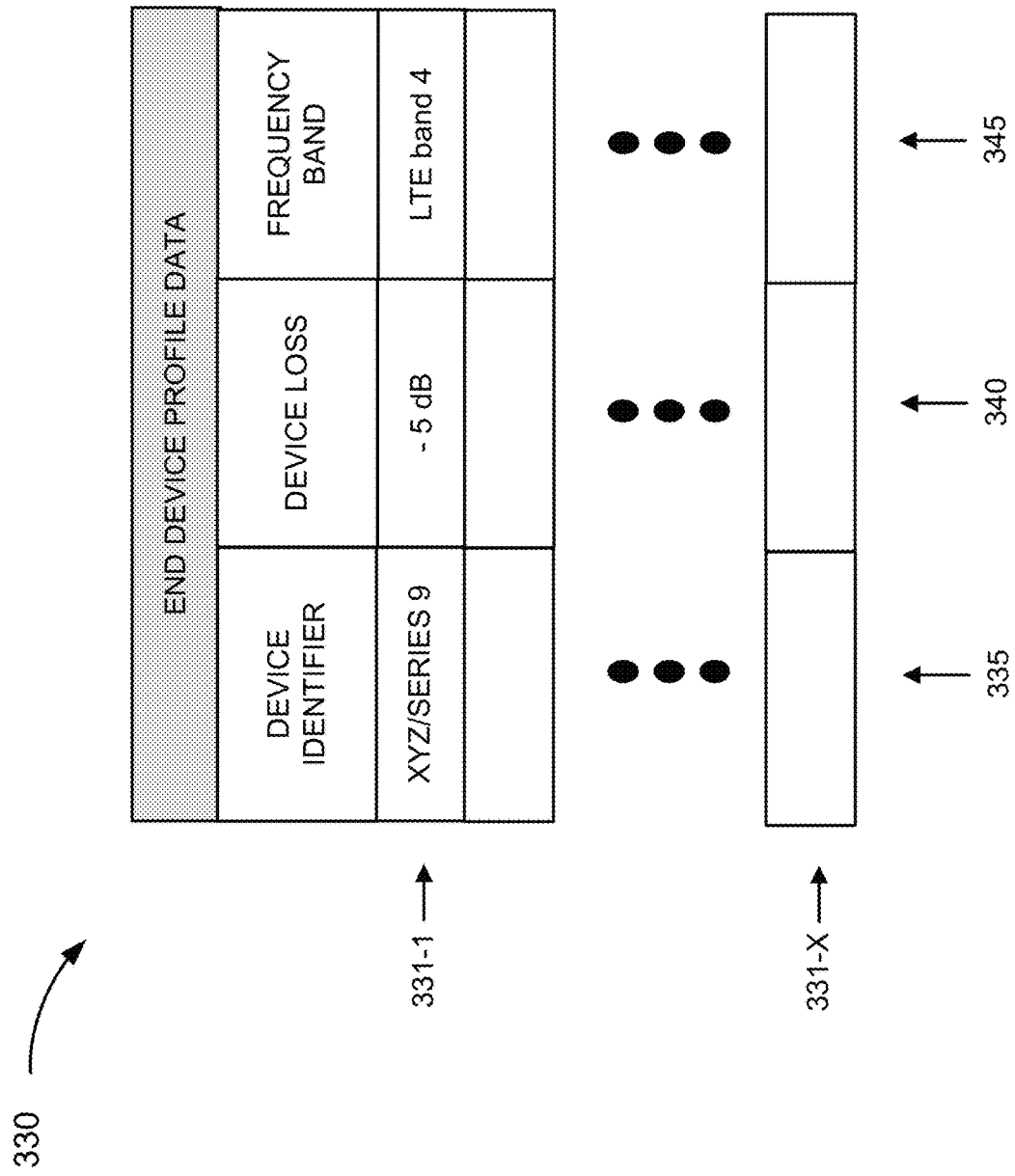
FIG. 3B is a diagram illustrating exemplary end device profile data of the fixed wireless qualification service.

FIG. 3B is a diagram illustrating exemplary end device profile data that may be stored in a table 330. As illustrated, table 330 may include a device identifier field 335, a device loss field 340, and a frequency band field 345. As further illustrated, table 330 includes entries 331-1 through 331-X (also referred as entries 331, or individually or generally as entry 331) that each includes a grouping of fields 335, 340, and 345 that are correlated (e.g., a record, etc.). End device profile data is illustrated in tabular form merely for the sake of description. In this regard, end device profile data may be implemented in a data structure different from a table. The values illustrated in entry 331-1 are exemplary.

Device identifier field 335 may store data indicating an identifier of end device 180. For example, device identifier field 335 may store make and model information pertaining to end device 180. Device loss field 340 may store data indicating an RF performance loss, as described herein. Frequency band field 345 may store data indicating a frequency band configured for end device 180.

According to other exemplary implementations, table 330 may store additional, fewer, and/or different instances of end device profile data in support of the fixed wireless qualification service, as described herein. The end device profile data may be used in support of one or multiple steps described herein in relation to an exemplary process of the fixed wireless qualification service.

According to various exemplary embodiments, the calculation of the path loss may use a free space (FS) path loss propagation model and/or another type of propagation loss model (e.g., a Hata model, COST 231-Hata model, a path loss model for use in the mm wave band, etc.). According to other exemplary embodiments, network device 110 may use a lookup table to calculate the path loss. For example, for different values of center frequencies and signal measurements, the lookup table may store path loss values that are based on one or multiple types of propagation models.

Figure 2F:
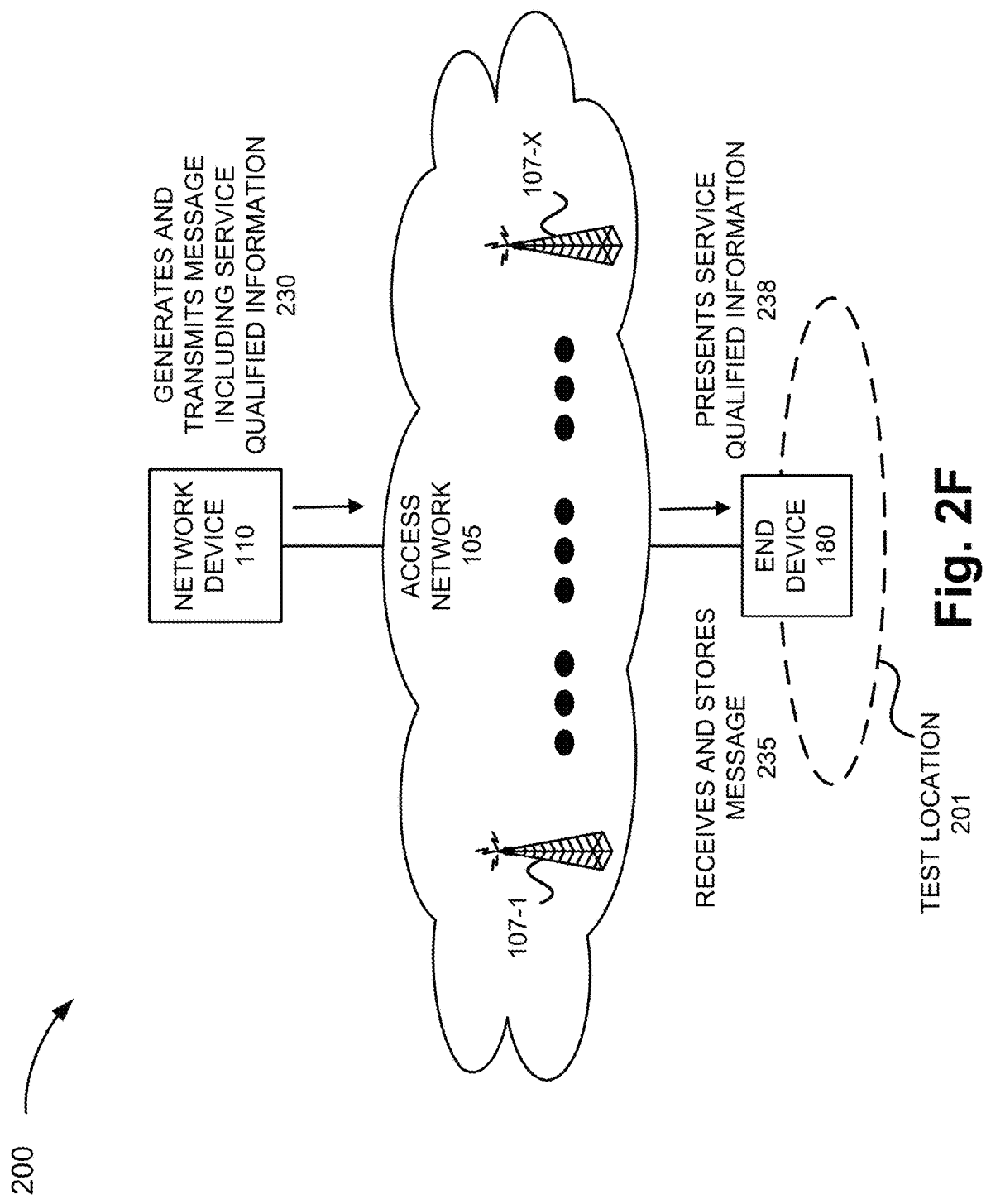

Referring to FIG. 2F, according to an exemplary embodiment, subsequent to the calculation of the service qualification values, network device 110 may generate and transmit a message that indicates the service qualified information 230. For example, the service qualified information may include the service qualification values and/or approval or disapproval of the intended application service requested. As further illustrated, end device 180 may receive and store the message 235, and may present (e.g., via a graphical user interface) the service qualified information to the user 238. Although, not illustrated, network device 110 may transmit the service qualified information to other network devices associated with the service provider (e.g., a customer service department device, etc.).

Although FIGS. 2A-2F illustrate an exemplary process of the fixed wireless qualification service, according to other exemplary embodiments, the process may include additional, different, and/or fewer steps. For example, network device 110 may not recalculate a parameter and parameter value when the test radio band is the same as the intended radio band for fixed wireless service.

Figure 4:
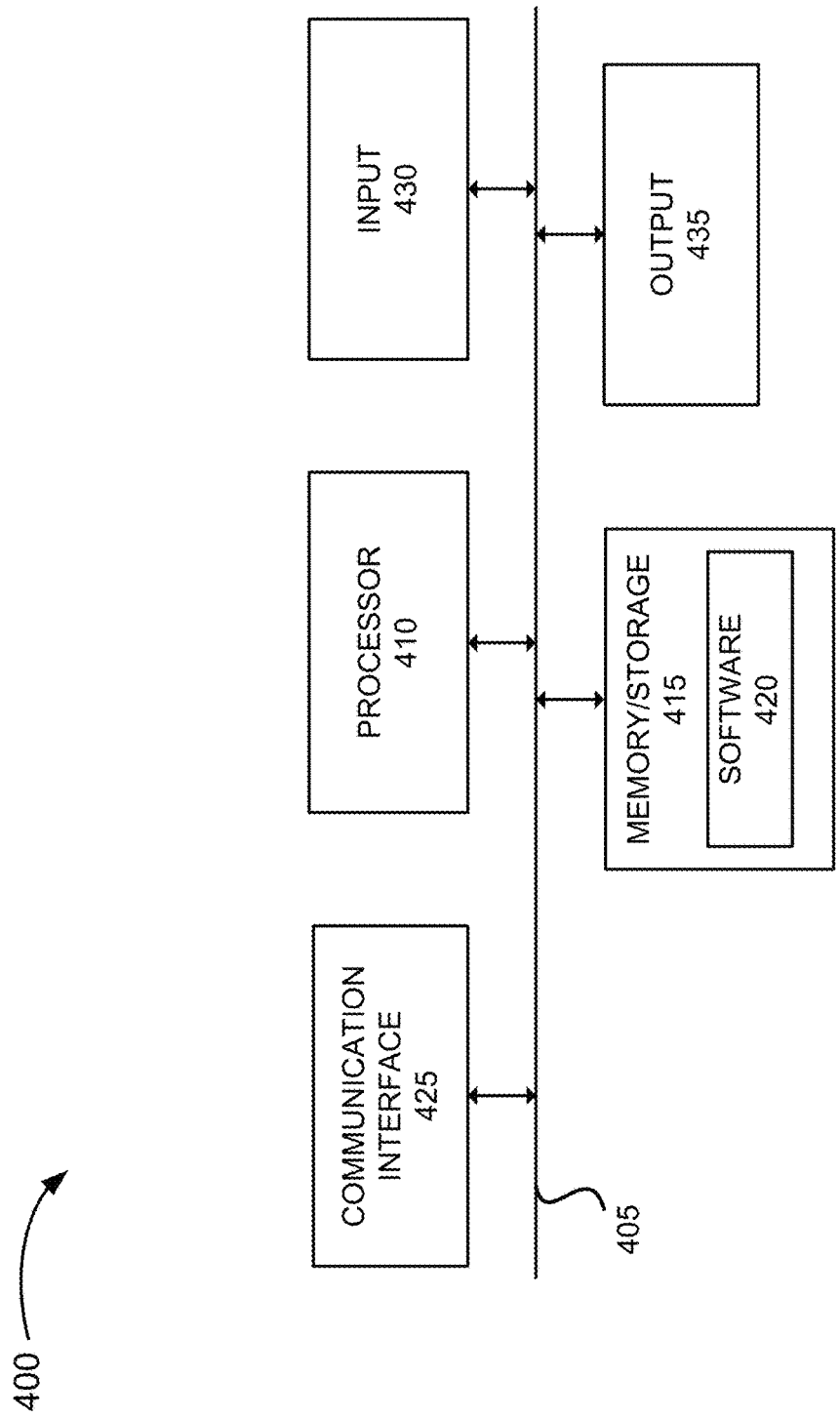
FIG. 4 is a diagram illustrating exemplary components of a device that may correspond to one or more of the devices illustrated and described herein.

FIG. 4 is a diagram illustrating exemplary components of a device 400 that may be included in one or more of the devices described herein. For example, device 400 may correspond to components included in end device 180, access device 107, and network device 110. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with respect to end device 180, software 420 may include an application that, when executed by processor 410, provides a function of the fixed wireless qualification service, as described herein. Additionally, with reference to network device 110, software 420 may include an application that, when executed by processor 410, provides a function of the fixed wireless qualification service, as described herein. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service based interface, etc.

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 400 may be implemented in the same manner. For example, device 400 may be instantiated, spun up, spun down, etc., using well-known virtualization techniques in a public/private cloud or other type of network.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5A:
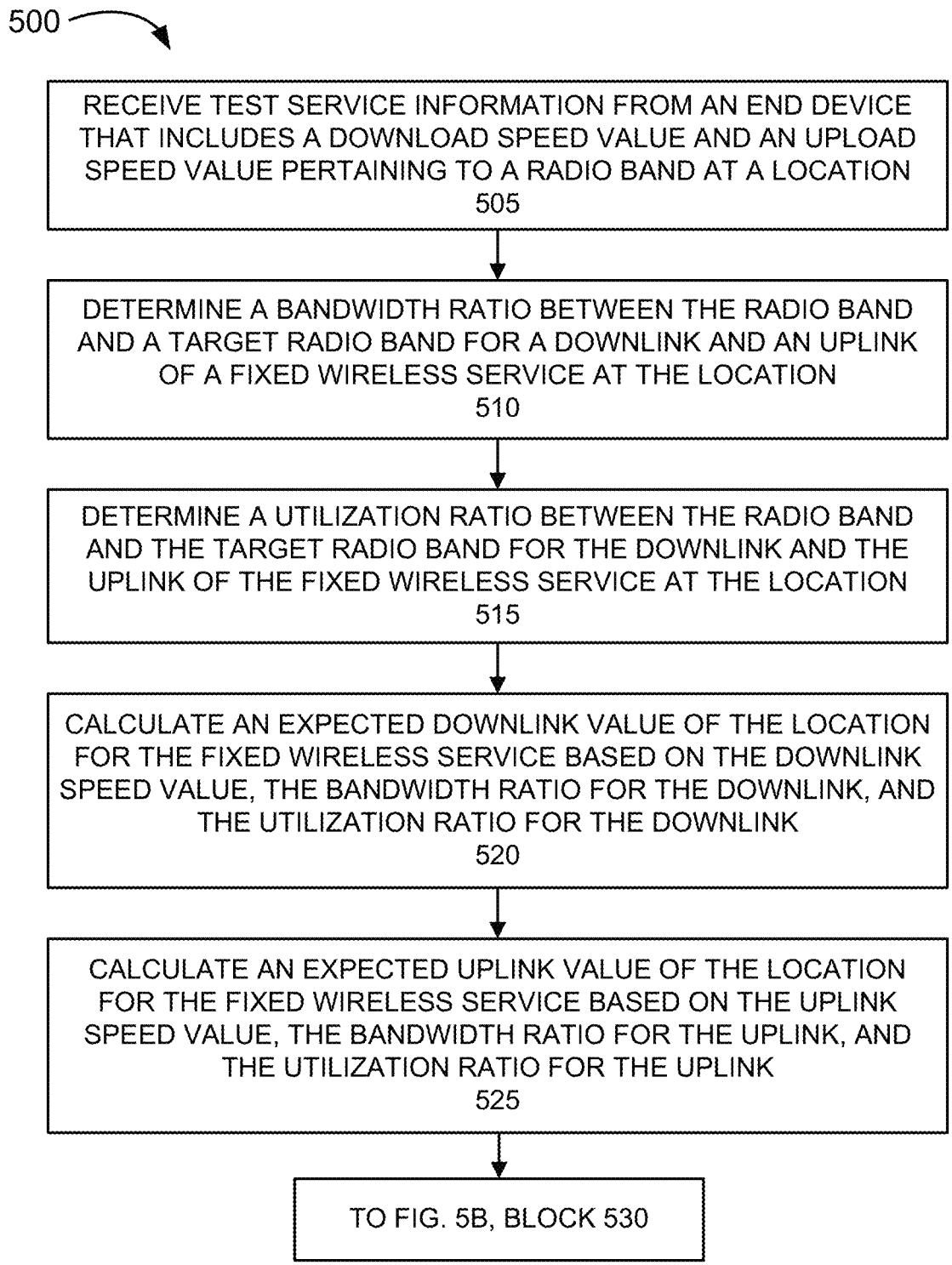
FIGS. 5A and 5B are flow diagrams illustrating an exemplary process of an exemplary embodiment of the fixed wireless qualification service.
Figure 5B:
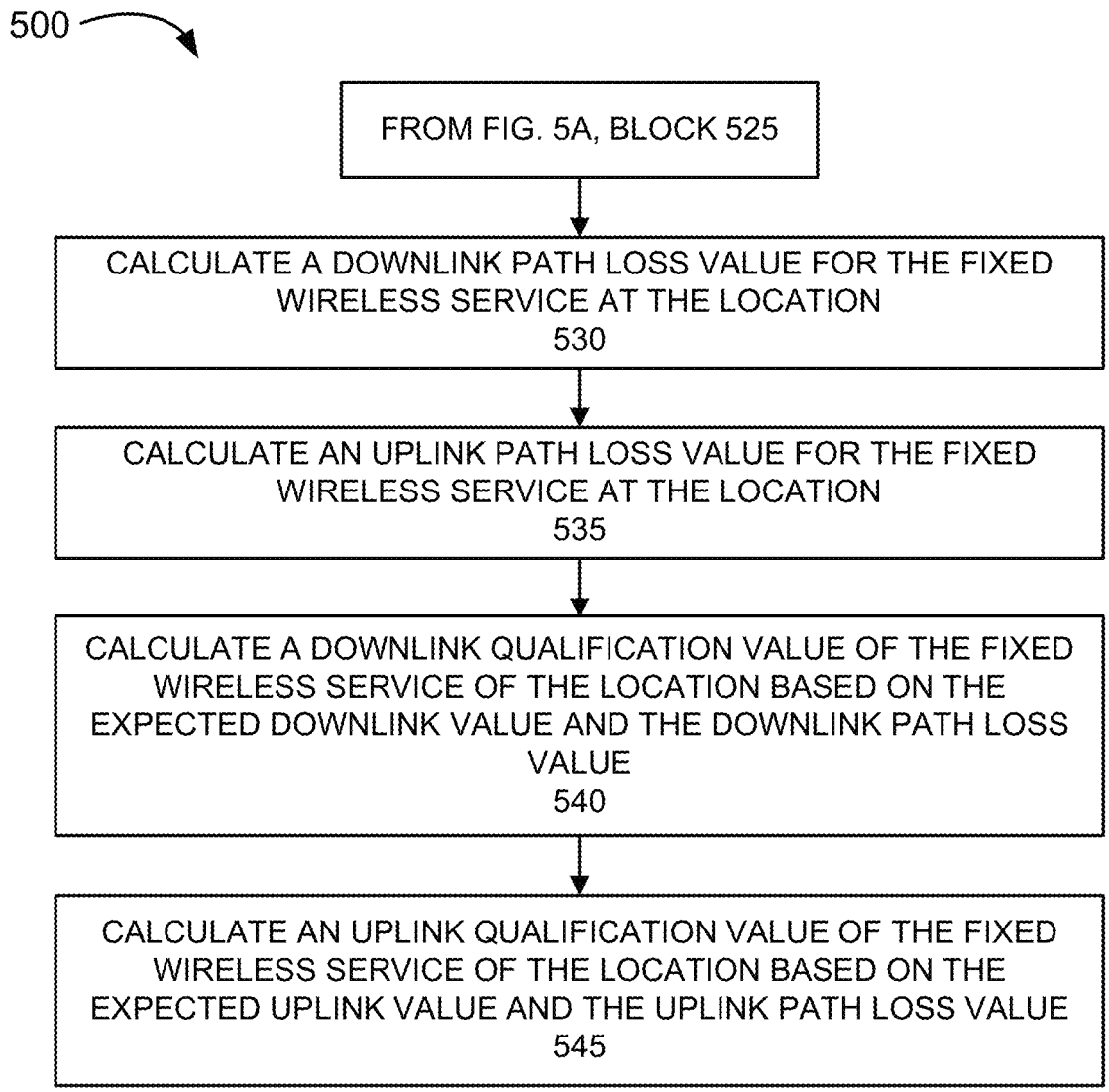

FIGS. 5A and 5B are flow diagrams illustrating an exemplary process 500 of an exemplary embodiment of the fixed wireless qualification service. According to an exemplary embodiment, network device 110 performs steps of process 500. For example, processor 410 executes software 420 to perform a step illustrated in FIGS. 5A and/or 5B, as described herein. Additionally, or alternatively, a step illustrated in FIG. 5A and/or 5B may be performed by execution of only hardware. According to this exemplary process, assume that end device 180 performs the testing service on a radio band that is different from the target radio band via which the prospective wireless service is to be provided.

Referring to FIG. 5A, in block 505, test service information that includes a download speed value and an upload speed value pertaining to a radio band of a location may be received from an end device. For example, network device 110 may receive test service information from end device 180. The test service information may include a download speed value, an upload speed value, a signal quality measurement value (e.g., RSRP, RSSI, SINR, etc.), and channel number information pertaining to the radio band from which the measurements were taken. The test service information may further include an identifier of end device 180 (e.g., end device profile information), date and time information, an identifier of access device 107 associated with the measurements, and/or test location information.

In block 510, a bandwidth ratio between the radio band and a target radio band for a downlink and an uplink of a fixed wireless service at the location may be determined. For example, network device 110 may calculate bandwidth ratios for the uplink and the downlink based on wireless network data and the test service information, as previously described.

In block 515, a utilization ratio between the radio band and the target radio band for the downlink and the uplink of the fixed wireless service at the location may be determined. For example, network device 110 may calculate utilization ratios for the uplink and the downlink based on utilization information from access device 107 that was involved in the download and upload speed tests, and wireless network data, as previously described. However, according to some exemplary embodiments, step 515 may be omitted because the utilization of the test radio band may not be available. This may be the case if, for example, end device 180 performs a test on another operator's access device 107/access network 105. According to such an exemplary scenario, reference signal-SINR (RS-SINR) and/or physical resource blocks (PRBs) allocated during the speedtest and pathloss may be used to estimate the utilization ratio.

In block 520, an expected downlink value of the location for the fixed wireless service may be calculated based on the downlink speed value, the bandwidth ratio for the downlink, and the utilization ratio for the downlink. For example, network device 110 may calculate the expected downlink value based on expression (3).

In block 525, an expected uplink value of the location for the fixed wireless service may be calculated based on the uplink speed value, the bandwidth ratio for the uplink, and the utilization ratio for the uplink. For example, network device 110 may calculate the expected uplink value based on expression (4).

Referring to FIG. 5B, in blocks 530 and 535, a downlink path loss value and an uplink path loss value for the fixed wireless service at the location may be calculated. For example, network device 110 may calculate the pass loss values for the uplink and the downlink based on expressions (5), (6), and (7) in which path losses associated with the radio band and the target band are considered, as well as the RF losses associated with end device 180 and the target device (e.g., the fixed wireless service device). According to other exemplary embodiments, network device 110 may use a look-up table or other type of data repository to identify the downlink and/or uplink path loss values based on correlated data, as previously described.

In blocks 540 and 545, a downlink qualification value and an uplink qualification value of the fixed wireless service at the location may be calculated based on expected downlink and uplink values and the downlink and uplink path loss values. For example, network device 110 may calculate the downlink and uplink qualification values based on expressions (1) and (2), as described herein.

Although FIGS. 5A and 5B illustrate an exemplary process 500 of the fixed wireless qualification service, according to other embodiments, process 500 may include additional operations, fewer operations, and/or different operations than those illustrated in FIGS. 5A and 5B, and described herein. For example, according to some exemplary embodiments, process 500 may calculate a qualification value for only the uplink or the downlink. For example, depending on the end user application or service that is to be supported by the fixed wireless service, the calculation of the qualification value for the uplink and the downlink may not be necessary. According to other exemplary embodiments, process 500 may include a step that determines whether the tested radio band is the same as the radio band via which the fixed wireless service is to be provided. According to yet other exemplary embodiments, network device 110 may not calculate the utilization value for the radio band of the fixed wireless service because the value may be a pre-configured or fixed number, as previously described.

According to an exemplary embodiment, process 500 may further include analyzing whether the qualification value satisfies a (requested) end user application or service. For example, network device 110 may compare a threshold downlink value and a threshold upload value associated with the end user application service to the qualification values. Based on the result of the comparison, network device 110 may determine whether the end user application or service can be supported at the location. Network device 110 may report the result of the comparison to an end user, personnel of the service provider (e.g., customer support department, etc.), and so forth. Additionally, or alternatively, network device 110 may identify end user applications or services that may be supported at the location based on a similar comparative procedure.

Figure 6:
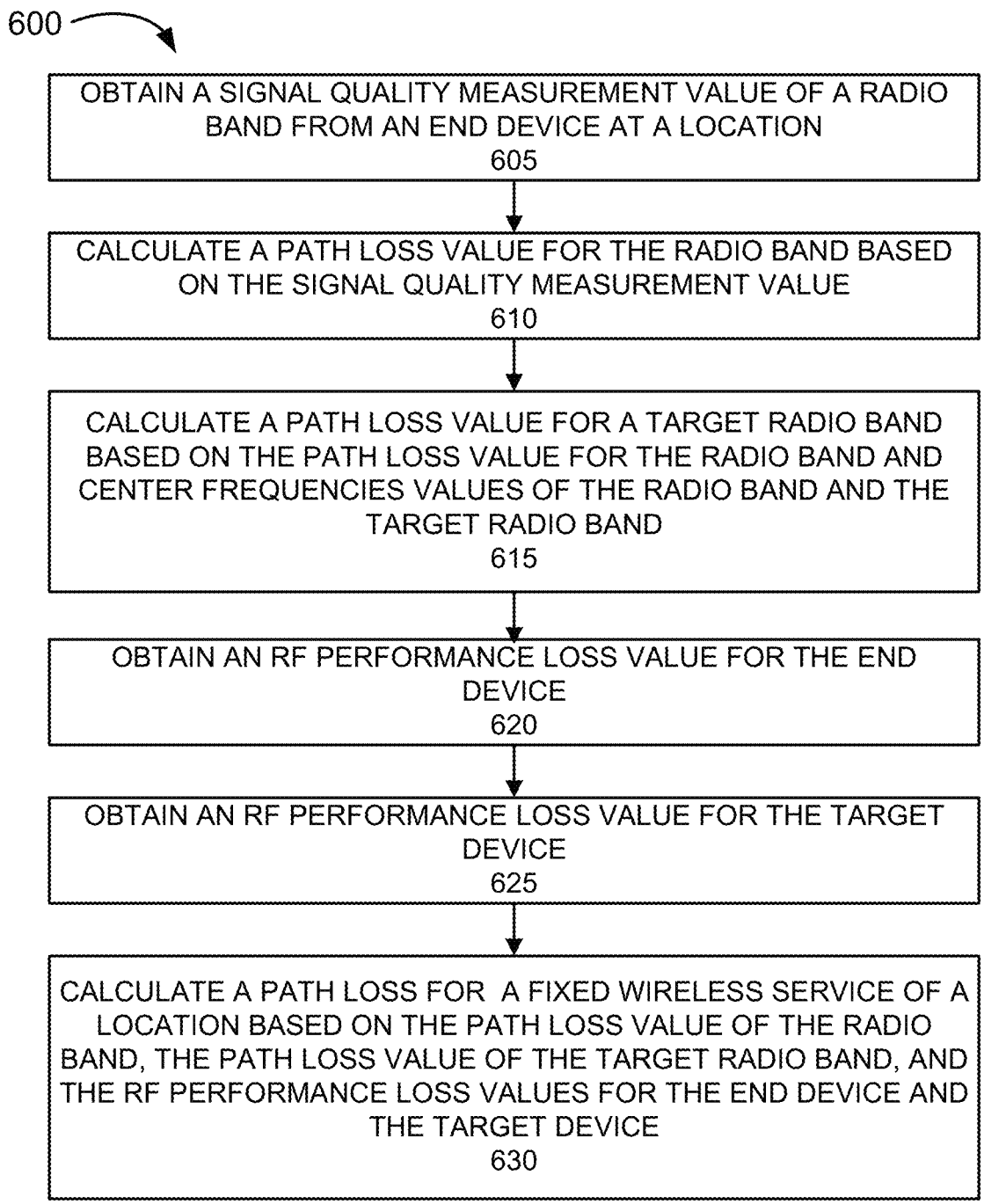
FIG. 6 is a flow diagram illustrating another exemplary process of an exemplary embodiment of the fixed wireless qualification service.

FIG. 6 is a flow diagram illustrating an exemplary process 600 of another exemplary embodiment of the fixed wireless qualification service. According to an exemplary embodiment, network device 110 performs steps of process 600. For example, processor 410 executes software 420 to perform a step illustrated in FIG. 6, as described herein. Additionally, or alternatively, a step illustrated in FIG. 6 may be performed by execution of only hardware. According to this exemplary process, assume that end device 180 performs the testing service on a radio band that is different from the target radio band via which the prospective wireless service is to be provided. According to an exemplary embodiment, process 600 may be performed to calculate the path loss for both the uplink and the downlink of a prospective fixed wireless service at a test location. According to other exemplary embodiments, process 600 may be performed to calculate the path loss for either the uplink or the downlink of the prospective fixed wireless service at the test location.

Referring to FIG. 6, in block 605, a signal quality measurement value of a radio band from an end device at a location may be obtained. For example, network device 110 may obtain a channel quality or channel condition measurement value from end device 180 included in the test service information, as described herein. The signal quality measurement value may include an RSRP value and/or another type of signal quality value, as previously described.

In block 610, a path loss value for the radio band may be calculated based on the signal quality measurement value. According to an exemplary embodiment, network device 110 may calculate the path loss value for the radio band based on expression (5). According to other exemplary embodiments, network device 110 may use other known expressions and/or techniques to calculate the path loss value.

In block 615, a path loss value for a target radio band may be calculated based on the path loss value for the radio band, and center frequency values of the radio band and the target radio band via which the prospective fixed wireless service is to be provided. For example, network device 110 may calculate the path loss value for the target band based on expression (6).

In blocks 620 and 625, RF performance values for the end device and a target device may be obtained. For example, network device 110 may obtain the RF performance values for end device 180 and the target device (e.g., the fixed wireless service device) based on device profile data, as previously described.

In block 630, a path loss for a fixed wireless service of the location may be calculated based on the path loss values of the radio band and the target radio band, and the RF performance loss values of the end device and the target device. For example, network device 110 may calculate the path loss value for the fixed wireless service based on expression (7).

Although FIG. 6 illustrates an exemplary process 600 of the fixed wireless qualification service, according to other embodiments, process 600 may include additional operations, fewer operations, and/or different operations than those illustrated in FIG. 6, and described herein. For example, according to other exemplary embodiments, blocks 620 and 625 may be omitted.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 5A, 5B, and 6, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising:
    receiving, by a network device and from an end device at a location, test service information pertaining to a first radio band;
    calculating, by the network device based on the test service information, an expected downlink speed value and an expected uplink speed value for prospective fixed wireless service at the location, wherein the prospective fixed wireless service is provisioned via a second radio band that is different from the first radio band;
    calculating, by the network device based on the test service information, a downlink path loss value and an uplink path loss value for the prospective fixed wireless service; and
    calculating, by the network device, an uplink service qualification value that indicates an uplink speed and a downlink service qualification value that indicates a downlink speed for the prospective fixed wireless service based on the expected downlink speed value, the expected uplink speed value, the downlink path loss value, and the uplink path loss value.

2. The method of claim 1, wherein the test service information includes an uplink speed, a downlink speed, a channel number of the first radio band, and end device profile information pertaining to the end device.

3. The method of claim 1, wherein the calculating of the expected downlink speed value and the expected uplink speed value comprises:
    calculating, by the network device, a bandwidth ratio that includes a first bandwidth of the first radio band and a second bandwidth of the second radio band; and
    calculating, by the network device, a utilization ratio that includes a first utilization value of the first radio band and a second utilization value of the second radio band.

4. The method of claim 3, wherein the calculating of the expected downlink speed value and the expected uplink speed value further comprises:
    calculating, by the network device, the expected downlink speed value based on the bandwidth ratio, the utilization ratio, and a downlink speed included in the test service information; and
    calculating, by the network device, the expected uplink speed value based on the bandwidth ratio, the utilization ratio, and an uplink speed included in the test service information.

5. The method of claim 1, wherein the calculating of the downlink path loss value and the uplink path loss value comprises:
    calculating, by the network device, a first path loss value pertaining to the first radio band; and
    calculating, by the network device, a second path loss value pertaining to the second radio band.

6. The method of claim 5, wherein the calculating of the downlink path loss value and the uplink path loss value further comprises:
    obtaining, by the network device, a first radio frequency performance loss value of the end device;
    obtaining, by the network device, a second radio frequency performance loss value of a prospective fixed wireless device via which the prospective fixed wireless service at the location is provisioned; and
    calculating, by the network device, the downlink path loss value and the uplink path loss value based on the first path loss value, the second path loss value, the first radio frequency performance loss value, and the second radio frequency performance loss value.

7. The method of claim 1, further comprising:
    determining, by the network device, whether the prospective fixed wireless service supports an end user application or service at the location based on the uplink service qualification value and the downlink service qualification value.

8. The method of claim 1, further comprising:
    transmitting, by the network device to another device, a message that includes the uplink service qualification value and the downlink service qualification value, wherein the message is responsive to a request to qualify for the prospective fixed wireless service at the location.

9. A network device comprising:
    a communication interface;
    a memory, wherein the memory stores instructions; and
    a processor, wherein the processor executes the instructions to:
        receive, via the communication interface and from an end device at a location, test service information pertaining to a first radio band;
        calculate, based on the test service information, an expected downlink speed value and an expected uplink speed value for prospective fixed wireless service at the location, wherein the prospective fixed wireless service is provisioned via a second radio band that is different from the first radio band;
        calculate, based on the test service information, a downlink path loss value and an uplink path loss value for the prospective fixed wireless service; and
        calculate an uplink service qualification value that indicates an uplink speed and a downlink service qualification value that indicates a downlink speed for the prospective fixed wireless service based on the expected downlink speed value, the expected uplink speed value, the downlink path loss value, and the uplink path loss value.

10. The network device of claim 9, wherein the test service information includes an uplink speed, a downlink speed, a channel number of the first radio band, and end device profile information pertaining to the end device.

11. The network device of claim 9, wherein, when calculating the expected downlink speed value and the expected uplink speed value, the processor further executes the instructions to:
calculate a bandwidth ratio that includes a first bandwidth of the first radio band and a second bandwidth of the second radio band; and
calculate a utilization ratio that includes a first utilization value of the first radio band and a second utilization value of the second radio band.

12. The network device of claim 11, wherein, when calculating the expected downlink speed value and the expected uplink speed value, the processor further executes the instructions to:
calculate the expected downlink speed value based on the bandwidth ratio, the utilization ratio, and a downlink speed included in the test service information; and
calculate the expected uplink speed value based on the bandwidth ratio, the utilization ratio, and an uplink speed included in the test service information.

13. The network device of claim 9, wherein, when calculating the downlink path loss value and the uplink path loss value, the processor further executes the instructions to:
calculate a first path loss value pertaining to the first radio band; and
calculate a second path loss value pertaining to the second radio band.

14. The network device of claim 13, wherein, when calculating the downlink path loss value and the uplink path loss value, the processor further executes the instructions to:
obtain a first radio frequency performance loss value of the end device;
obtain a second radio frequency performance loss value of a prospective fixed wireless device via which the prospective fixed wireless service at the location is provisioned; and
calculate the downlink path loss value and the uplink path loss value based on the first path loss value, the second path loss value, the first radio frequency performance loss value, and the second radio frequency performance loss value.

15. The network device of claim 9, wherein the processor further executes the instructions to:
determine whether the prospective fixed wireless service supports an end user application or service at the location based on the uplink service qualification value and the downlink service qualification value.

16. The network device of claim 9, wherein the processor further executes the instructions to:
transmit, via the communication interface to another device, a message that includes the uplink service qualification value and the downlink service qualification value, wherein the message is responsive to a request to qualify for the prospective fixed wireless service at the location.

17. A non-transitory computer-readable storage medium storing instructions executable by a processor of a device, which when executed cause the device to:
receive, from an end device at a location, test service information pertaining to a first radio band;
calculate, based on the test service information, an expected downlink speed value and an expected uplink speed value for prospective fixed wireless service at the location, wherein the prospective fixed wireless service is provisioned via a second radio band that is different from the first radio band;
calculate, based on the test service information, a downlink path loss value and an uplink path loss value for the prospective fixed wireless service; and
calculate an uplink service qualification value that indicates an uplink speed and a downlink service qualification value that indicates a downlink speed for the prospective fixed wireless service based on the expected downlink speed value, the expected uplink speed value, the downlink path loss value, and the uplink path loss value.

18. The non-transitory computer-readable storage medium of claim 17, wherein the test service information includes an uplink speed, a downlink speed, a channel number of the first radio band, and end device profile information pertaining to the end device.

19. The non-transitory computer-readable storage medium of claim 17, wherein the instructions to calculate the expected downlink speed value and the expected uplink speed value further comprise instructions, which when executed cause the device to:
calculate a bandwidth ratio that includes a first bandwidth of the first radio band and a second bandwidth of the second radio band; and
calculate a utilization ratio that includes a first utilization value of the first radio band and a second utilization value of the second radio band.

20. The non-transitory computer-readable storage medium of claim 19, wherein the instructions further comprise instructions, which when executed cause the device to:
determine whether the prospective fixed wireless service supports an end user application or service at the location based on the uplink service qualification value and the downlink service qualification value.

* * * * *